Aug. 18, 1964 TOITSU NAKAJIMA 3,145,094
PROCESS AND APPARATUS FOR MAKING STEEL FROM POWDERED IRON ORE
Filed Sept. 6, 1960
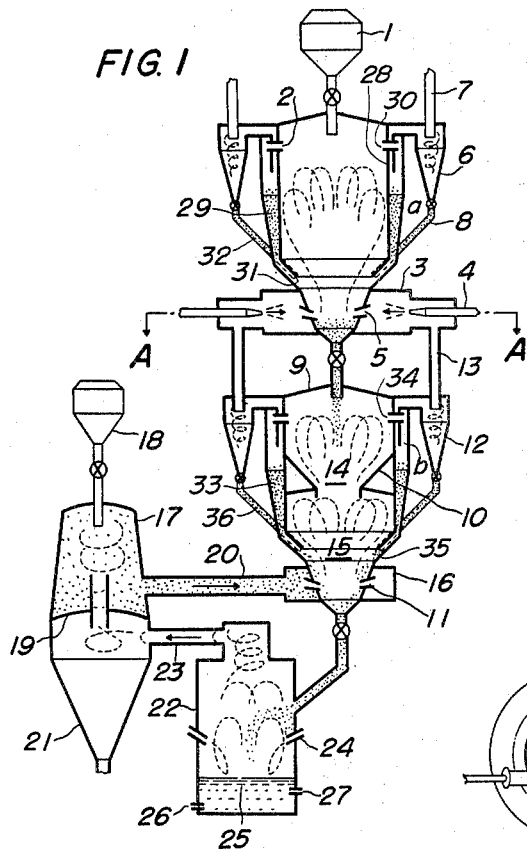
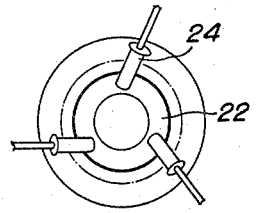
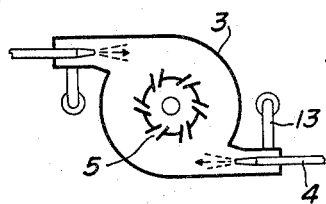
INVENTOR.
TOITSU NAKAJIMA
BY
ATTORNEYS United States Patent Office 3,145,094
Patented Aug. 18, 1964

3,145,094
PROCESS AND APPARATUS FOR MAKING STEEL FROM POWDERED IRON ORE
Toitsu Nakajima, 1224 Fujisawa, Fujisawa-shi, Japan
Filed Sept. 6, 1960, Ser. No. 54,023
Claims priority, application Japan Sept. 12, 1959
3 Claims. (Cl. 75—38)

This invention relates to a direct steel-making process from pulverized iron-containing materials and an apparatus therefor. Particularly, this invention is concerned with direct production of steel from pulverized iron ore, lower grade taconite, sulfuric acid waste, laterite, iron sand and the like.

In iron-producing processes by the use of blast furnaces, drying, preheating, reducing, cementation and melting of ore are effected with one furnace, but these steps are not always effected at a definite level and a definite temperature, and are time consuming. These conditions provide chances to absorb carbon, silicon and like elements in iron and the product is essentially pig iron. When pulverized iron ore is used in place of lump ore, surface area is increased as much as several hundred to several ten thousand times, while diameter is reduced as much as one several hundredths to one several ten-thousandths, according as grain size is smaller. It is clear, therefore, that a reaction utilizing pulverized ore will proceed within a time less than one-hundredth of the time required for a blast furnace, so long as other conditions are identical.

In the accompanying drawings, FIGURE 1 is a schematic view of the apparatus, FIGURE 2 is a sectional view along with lines A—A of the apparatus of FIGURE 1 and FIGURE 3 is a sectional view of melting furnace.

An object of the present invention is to provide a method for direct making of steel from pulverized iron-containing materials and an apparatus therefor.

Generally speaking, the present invention is carried out in such a manner that the pulverized iron-containing materials are first fed into an oxidizing roasting zone in which the pulverized materials are oxidation roasted by a combustion gas, such gas exhausting from a reduction roasting zone with air. The roasted materials are next fed to the reduction roasting zone in which the resultant oxidized materials are reduced by a gas introduced from a gas controlling zone to convert the materials into sponge iron. In the gas controlling zone, a gas produced from a melting zone is mixed with an atomized heavy oil or solid carbons. The reduction roasted material or sponge iron is finally fed to the melting zone in which the material is melted by the heat generated in the incomplete combustion at about 1600° C. of a heavy fuel oil, pulverized coal or natural gas with oxygen or air abundant in oxygen. The melted materials or steel are then tapped out.

According to the present invention, both the oxidation roasting and the reduction roasting are carried out at a temperature below that at which ore is softened and fuses, i.e., not higher than about 1050° C. Reduction-roasting is also effected as rapidly as possible to reduce absorption of carbon and the other elements in reduced sponge iron.

In order to obtain intimate mixture or facilitate sufficient contact between pulverized materials and countercurrently flowing gas stream, the pulverized materials are fluidized by the vortex upstream gas to form a concentrated fluidizing bed of the materials. Reaction ability of solid pulverized materials increases with solid material fineness, but separation of the solid materials from gas after a reaction becomes more difficult. Even though complete reaction of pulverized materials is effected, it is not economical if the materials are carried over accompanied by the gas stream and the carried materials are recovered out of the reaction zone. Separation of the pulverized materials from gas stream should be effected within reactors or furnaces as completely as possible to facilitate conveyance of the settled pulverized materials from a reaction zone to the next reaction zone, maintaining sensible heat of the materials as high as possible. The gas which flows countercurrently with pulverized materials has a temperature of about 1000° C. and is more viscous. In order to fluidize and effectively catch the pulverized materials by the gas, the flowing speed has to be controlled so that the solid pulverized materials fall within the reactors at a speed which approaches to an end speed of free falling. This will make sectional area of reactors greater. To avoid this disadvantage, oxidizing and reducing roasters are constructed in a fashion of double walls. That is to say, dedusting zones are provided around the roasters to separate the pulverized materials from gas and return the separated pulverized materials to the bottom of the roasters, respectively, with the result that the pulverized materials are cycled and the reactions are made uniform. In the present invention, flowing speed of gas stream within the reactors is maintained at 0.6–1.0 m./sec., thereby diameters of reactors are reduced to about 1/2.5 of that of a furnace in which pulverized material falls freely.

Sponge iron which settles at the bottom of the reduction roasting zone is also a fine material and so is liable to be carried over accompanied by a gas stream, thereby the operation is made impossible. To avoid this, the melting zone has to have more than 3 oil burners provided at an inclined angle of 10–35° toward below and at an eccentric angle of 12–20° to form a violent, whirling flame. Such flame aid in the formation of free vortex having the highest rotation speed around a central axis, reduction of static pressure around the axis, and formation of a countercurrent flow directing to the bottom of the melting zone, thereby the sponge iron falls into the countercurrent flow to facilitate complete melting without escape from the melting zone.

The present invention will be illustrated in detail referring to the accompanying drawings in connection with, particularly, pulverized iron ore.

RAW MATERIALS

Low grade taconite, sulfuric acid waste, iron sand, laterite and other low grade pulverized iron-containing materials may be used in addition to pulverized iron ore. Such materials as limestone, quicklime, coke and others are mixed to the iron-containing materials, as is well known in steel-making.

OXIDIZING-ROASTING

A charge comprising pulverized iron ore and limestone is fed at constant rate from hopper 1 to an oxidizing-roasting furnace 2. The furnace is double walled, and cylindrical and the lower part thereof is conical. The charge is heated for 40–50 min. at a temperature of 800°+100° C. at the upper part and 1050°±50° C. at the lower part by a combustion gas. The combustion gas is obtained in a chamber 3 mounted around the bottom part of the furnace 2 by combustion of a combustible gas comprising hydrogen, steam, carbon monoxide and carbon dioxide, and having left a cyclone collector 12 mounted beneath the roasting furnace 2, with air burners 4. The combustion gas is jetted tangentially at a speed of 10–15 m./sec. into the bottom of the furnace 2 through eccentrically arranged tuyeres 5 as shown in FIGURE 2 to form a whirling ascending stream of the gas within the furnace thereby fluidizing while oxidizing the charge which falls downwardly. The gas stream hits the ceiling of the furnace 2 and rotates thereabout to centrifuge the major part of the entraining pulverized charge which falls along wall 28. The gas further shoots out in a clearance $a$ between the walls 28 and 29 through upper opening 30, thereby the entrained solid charge is separated from gas and falls on tuyeres 5 through bottom opening 31. The rest of the gas entraining the remained solid charge further enters into the cyclone collector 6 and the waste gas is exhausted through chimney 7 while the settling solid charge is returned to the lower part of the furnace 2 through a conduit 32. The charge fed to the furnace 2, after all, resides in the furnace to such an extent of about 87% and the balanced 13% settles and is sent to the subsequent reduction roasting zone. The settled charge or oxidation roasted charge, if desired, may be subjected to a magnetic concentration before being sent to the reducing zone. Dust carried from the cyclone separator 6 amounts only to 0.24%.

In the present oxidation-roasting furnace, preheating, drying, complete oxidation and desulfurization of ore as well as preheating and decomposition of limestone are effected. The ore is made coarser thereby enhancing the subsequent reduction of ore.

In the furnace, the following reactions are carried out:

$$FeS+3O_2=FeO+SO_2$$
$$FeO+O_2=Fe_2O_3$$
$$2Fe_3O_4+\tfrac{1}{2}O_2=3Fe_2O_3$$

REDUCING-ROASTING

The oxidation roasted charge is then fed to a reduction-roasting furnace 9. The furnace 9 is double walled and vertically cylindrical and has waist 10 at the middle part, bottom part being conical. From the bottom of the furnace a reducing gas is injected tangentially from gas holder 16 through eccentrically arranged tuyeres 11 to form vortex flow of the gas within the furnace. The oxidation-roasted charge goes down in the furnace against the vortex-like, ascending flow of gas and the waist 10 also serves to inhibit the charge from going down smoothly, thereby resident period of charge is made longer and sintering of the charge is prohibited. Residing period in the roasting zone is about 60–90 min. Temperature at the portion of injection of the reducing gas is 1000°±50° C. The reducing gas introduced consists of hydrogen and carbon monoxide and often comprises carbon particles. The gas is produced at a gas-controlling chamber 17 stated hereinbelow. The temperature in the roasting furnace 9 is maintained by sensible heats of the fed oxidizing roasted charge (about 1000° C.) and the reducing gas (about 980° C.–1000° C.). The gas left the reducing-roasting furnace 9 is once led to a cyclone collector 12 and the gas containing hydrogen, steam, carbon monoxide and carbon dioxide is sent to the chamber 3 through pipe 13 while the settled materials are returned to the lower part of the furnace 15.

The upstream flow of gas hits the ceiling of the furnace 9 and its behavior thereabout is similar with that in the oxidizing roasting furnace 2. The signature $b$ is a clearance formed around wall 33. 34, 35 and 36 respectively correspond to 30, 31 and 32 of the furnace 2.

The reactions effected in the furnace are as follows:
In the upper part 14, $$3Fe_2O_3+\begin{Bmatrix}CO\\ H_2\end{Bmatrix}=2Fe_3O_4+\begin{Bmatrix}CO_2\\ H_2O\end{Bmatrix}$$

$$2Fe_3O_4+2\begin{Bmatrix}CO\\ H_2\end{Bmatrix}=6FeO+2\begin{Bmatrix}CO_2\\ H_2O\end{Bmatrix}$$

In the lower part 15, $$FeO+\begin{Bmatrix}H_2\\ CO\end{Bmatrix}=Fe+\begin{Bmatrix}H_2O\\ CO_2\end{Bmatrix}$$

$$C+\begin{Bmatrix}H_2O\\ CO\end{Bmatrix}=\begin{matrix}CO+H_2\\ =2CO\end{matrix}$$

From the bottom of the furnace 9, sponge iron (about 1000° C.) is discharged to a melting furnace 22.

GAS-CONTROLLING

Gas to be fed to the bottom of the furnace 9 is prepared in gas-control chamber 17, as mentioned above. The chamber is sectioned into two parts by a perforated baffle plate 19 and into the lower section a gas produced in a melting furnace 22 is led. The gas from furnace 22 consists of steam, hydrogen, carbon monoxide and carbon dioxide, having a temperature above 1550° C., and ascends in a vortex form within the chamber 17. The lower sectional part acts as a separator of fine solids contained in the fed gas. In the upper section, the ascending gas is contacted with such solid carbons as pulverized anthracite, coke, semi-coke, charcoal and the like, which are fed from hopper 18. Alternatively, atomized heavy oil may be introduced in place of the solid carbon. Heavy oil is better than the solid carbon, because of the fact that the amount as well as reducing capacity of the produced gas to be fed to the furnace 9 increase.

The amount of solid carbon or atomized heavy oil added in the upper section depends on amounts of carbon dioxide and steam in the gas led from furnace 22. This amount is the sum of an amount required to convert $CO_2$ and $H_2O$ as mentioned above into CO and $H_2$ and an amount required to carry out reduction in the reducing roasting furnace 9. That is, the reactions of $$C+H_2O \rightarrow CO+H_2 - 31{,}382 \text{ kcal.}$$
$$C+CO_2 \rightarrow 2CO - 41{,}220 \text{ kcal.}$$

are carried out. It will be seen from these equations which are endothermic that gas temperature decreases from about 1600° C. to about 1000° C. and the composition is regulated so that it fits to reducing roasting in the furnace 9. The regulated gas is fed through a pipe 20 to the gas holder 16. In the bottom 21, the separated solids accumulate and are tapped out as slag.

MELTING AND GASIFICATION

The roasted sponge iron from the furnace 9 is fed to a vertical type, melting furnace 22 mounted beneath the furnace 9. Gasification as well as melting are effected in the furnace 22. An end of the furnace connects with the gas control chamber 17 by a pipe 23 through which an exhaust gas containing slag is fed to chamber 17. From the both sides end of the furnace, a fuel such as heavy oil, pulverized coal, natural gas and the like, and oxygen or oxygen rich air are fed to cause incomplete combustion, thereby to maintain the temperature of 1600° C. or more. The sponge iron fed to the furnace 22 readily melts by the combustion of the fuel and a gas which is reducing is simultaneously formed. A ratio of $(H_2+CO)/(CO+CO_2+H_2+H_2O)$ in the gas is not less than 75%.

In order to effect the above mentioned combustion of the fuel, the fuel and oxygen are fed through at least 3 burners eccentrically (12–20°) mounted on the periphery of the furnace and inclined at an angle of 10–35° toward the bottom of the furnace, as shown in FIGURE 3, thereby a whirling flame is formed. As previously stated, free vortex is formed around the central axis and pressure drop is caused thereby suction of the sponge iron fed from the furnace 9 is completely effected. Molten steel accumulates in a basin 25 and then tapped out of mouth 26. Slag is tapped out of mouths 27 as well as the bottom 21 of chamber 17 as mentioned above.

In order to produce 1 ton of molten steel when heavy oil is used as the fuel, operation conditions are as follows.

(1) Melting furnace:
   Feed—
      Sponge iron and limestone (from roasting furnace 9)_____kg__ 1,530
      Heavy oil _____kg__ 297
      Oxygen (98%) _____Nm.$^3$__ 302

| | Nm.$^3$ | Vol. percent |
|---|---|---|
| Produced gas (A) | 1,104.2 | 38.7 |
| $H_2$ | 427.4 | 47.4 |
| CO | 523.2 | |
| $H_2O$ | 82.1 | 7.4 |
| $CO_2$ | 71.6 | 6.5 |
| | | 100 |

Temperature, 1,600° C.

(2) Gas-control chamber:
   Feed—
      The above mentioned produced gas (A) _____Nm.$^3$__ 1,104
      A mixture of anthracite, semi-coke and charcoal (solid carbon: 112 kg.)__kg__ 150
   Produced gas (B)_____Nm.$^3$__ 1,258
      $H_2$ _____ 509.5
      CO _____ 748.5
   C _____kg__ 32
   Slag (tapped out) _____kg__ 5.3
   Temperature—
      Upper portion _____° C__ 1,000
      Lower portion _____° C__ 1,600

(3) Reducing roasting furnace:

| Feed— | | |
|---|---|---|
| Pulverized oxidized ore | 1,850 kg | From furnace 2. |
| CaO | 160 kg | |
| Gas (B) | 1,258 Nm.$^3$ | |
| Produced gas (C) | 1,308 Nm.$^3$ | |
| $H_2$ | 227.9 Nm.$^3$ | 17.4 vol. percent. |
| $H_2O$ | 281.6 Nm.$^3$ | 21.5 vol. percent. |
| CO | 474.5 Nm.$^3$ | 36.3 vol. percent. |
| $CO_2$ | 324.0 Nm.$^3$ | 24.8 vol. percent. |
| | | 100%. |

Temperature, 1,000° C.

(4) Oxidizing roasting furnace:
   Feed—
      Ore (Fe 60%) _____kg__ 1,850
      CaO _____kg__ 300
      (Water content) _____kg__ 100
      Gas (C)[1] _____Nm.$^3$__ 700
      Air for burner _____Nm.$^3$__ 1,000
   Produced waste gas_____Nm.$^3$ (600° C.)__ 1,360
   Temperature—
      Upper _____° C__ 850
      Bottom _____° C__ 1050

[1] The rest 608 Nm.$^3$ (=1308−700) is used to some other service.

*Example 1*

Charge:
   Feed—
      Hematite (Goa) _____kg__ 2,000
      Quicklime _____kg__ 150
   Analysis of hematite (wt. percent)—

| Fe | $SiO_2$ | MnO | P | S | Cu |
|---|---|---|---|---|---|
| 57.90 | 2.95 | 0.36 | 0.146 | 0.21 | 0.04 |

Feed rate_____ 400 kg./hr. of hematite.
Heavy oil (C=85%)_____ 375 kg./t. Fe.
Oxygen (98%)_____ 377 Nm.$^3$/t Fe.
Heavy oil for gas control___ 135 kg./t. Fe.
Feed mesh—
   30–60 _____percent__ 23.0
   60–80 _____do____ 12.0
   80–120 _____do____ 15.0
   120–160 _____do____ 21.0
   160–200 _____do____ 18.0
   >200 _____do____ 11.0

Operation:

| Oxidizing roasting | 1,050° C | 40 min. |
|---|---|---|
| Reducing roasting | 980° C | 60 min. |
| Melting | 1,580–1,600° C | 60 min. |
| | | 2 hr. 40 min. |

Yield, 99.8%.
Analysis of product steel (wt. percent)—

| C | Si | Mn | P | S | Cu |
|---|---|---|---|---|---|
| 0.010–0.04 | 0.016–0.03 | 0–0.01 | 0.004–0.008 | 0.033–0.044 | 0–0.01 |

*Example 2*

Charge:
   Feed—
      Iron sand _____kg__ 1,000
      Limestone _____kg__ 300
   Analysis of the iron sand (wt. percent)—

| $SiO_2$ | $Al_2O_3$ | P | S | Cu | Fe |
|---|---|---|---|---|---|
| 4.90 | 0.48 | 0.036 | 0.010 | 0.069 | 56.18 |

Feed rate _____ 400 kg./hr. of iron sand.
Feed mesh—
   +60 _____percent__ 0.65
   60–100 _____do____ 11.51
   100–150 _____do____ 22.44
   150–200 _____do____ 8.47
   200–250 _____do____ 5.59
   −250 _____do____ 0.91

Operation:

| Oxidizing roasting | 1,050° C | About 50 min. |
|---|---|---|
| Reducing roasting | 1,050° C | 60 min. |
| Melting | 1,580–1,600° C | 60 min. |
| | | About 2 hr. 50 min. |

Yield, 99.76%.
Analysis of product steel (wt. percent):

| C | Si | Mn | P | S | Cu | Cr |
|---|---|---|---|---|---|---|
| 0.15 | 0.152 | 0.21 | 0.073 | 0.04 | 0.02 | trace |

Example 3

Charge:
  Feed—
    Garnierite _____ kg__ 1,000
    Quicklime _____ kg__ 100
  Analysis of garnierite (wt. percent)—

| Ni | Co | Fe | SiO$_2$ | MgO | Cr | Al$_2$O$_3$ | P | S | Ignition loss |
|---|---|---|---|---|---|---|---|---|---|
| 3.32 | 0.07 | 13.80 | 46.42 | 19.24 | 0.69 | 0.88 | 0.002 | 0.022 | 10.66 |

Feed rate _____ 400 kg./hr. of garnierite.
Heavy oil (C=85%) _____ 210 kg./t. garnierite.
Oxygen (98%) _____ 213 Nm.$^3$/garnierite.
Charcoal for gas control___ 65 kg./garnierite.
Feed mesh—
  60–80 _____ 2.3 percent.
  80–120 _____ 15.0 percent.
  120–160 _____ 17.0 percent.
  160–180 _____ 11.0 percent.
  180–200 _____ 8.7 percent.
  >200 _____ 47.0 percent.

Operation:

| Oxidizing roasting | 1,200° C | About 70 min. |
|---|---|---|
| Reducing roasting | 1,100° C | 70 min. |
| Melting | 1,580–1,600° C | 70 min. |
| | | About 3 hr. 30 min. |

Yield, 99.5%.
Analysis of product steel:

| C | Si | Mn | P | S | Ni | Cr | Co |
|---|---|---|---|---|---|---|---|
| 0.14 | 0.012 | ---- | ---- | ---- | 22.79 | 0.14 | 0.54 |

Analysis of slag:

| NiO | Fe |
|---|---|
| trace | 2.63 |

What I claim is:
1. In a process for making steel from powdered iron ore comprising the steps of oxidation roasting said ore, reduction roasting said ore and melting the resultant reduced product, each step being effected in a separate zone, the improvement comprising
  (1) oxidation roasting powdered iron ore-limestone fluidized mass to calcination in a first zone, said fluidized mass being created by blowing exhaust gas from said reduction roasting through said first zone, whereby said powdered iron ore-limestone mass is oxidized,
  (2) cyclone separating said resultant oxidized fluidized mass, whereby oxidized powdered iron ore admixture is separated from fluidizing gas,
  (3) reduction roasting the resultant powdered admixture from step (2) in fluidized mass in the presence of carbon, said fluidized mass being created by blowing elemental carbon-containing reducing gas of step (6) therethrough, whereby elemental iron is produced,
  (4) cyclone separating the resultant reduced fluidized mass, whereby elemental iron is separated from said reducing gas,
  (5) melting resultant elemental iron in a melting zone at about 1600° C., heat for said melting provided by combusting hydrocarbon with oxygen in said zone, whereby liquid iron and reducing gas are produced,
  (6) admixing the resultant reducing gas with carbonaceous material to thereby form fluidizing gas for the reduction roasting of step (3).

2. Process for making steel from powdered iron ore comprising
  (1) roasting a limestone-powdered iron ore admixture to calcination in a first roasting zone for about 40 to 60 minutes at about 1050° C., said roasting being effected by fluidizing said admixture with exhaust gas from a reducing furnace, whereby said admixture is substantially completely oxidized,
  (2) roasting the resultant oxidized admixture in a second roasting zone for about 60 to 120 minutes, said roasting being effected by fluidizing said admixture with elemental carbon-containing reducing gas, whereby elemental iron and exhaust gas of step (1) are produced,
  (3) melting the resultant elemental iron in a melting zone, heat for said melting provided by combusting hydrocarbon with oxygen in said zone, whereby liquid iron and reducing gas are produced, and
  (4) admixing the resultant reducing gas with carbonaceous material to thereby form carbon-containing reducing gas of step (2).

3. In an apparatus for direct steel making from powdered iron ore, (1) a roasting furnace, (2) a reducing furnace, (3) a melting furnace and (4) a gas refining room, the roasting furnace being cylindrical with a conical bottom, the upper cylindrical portion of the roasting furnace having a feeding hopper operatively attached directly thereto, the lower conical portion of the roasting furnace being partially enclosed in a gas combustion chamber and having a plurality of gas tuyeres from said gas combustion chamber; the reducing furnace being cylindrical with a conical bottom, the cylindrical upper portion being interiorly divided by at least 2 funnel-shaped baffle plates, said cylindrical upper portion being connected to an outlet at the lower extreme of the conical portion of the roasting furnace, the lower conical portion of the reducing furnace being partially enclosed by a gas holding chamber and having a plurality of gas tuyeres from said gas holding chamber; the melting furnace being cylindrical and having an inlet connected to the lower extreme of the lower conical portion of the reducing furnace, eccentrically to the central axis of the melting furnace and between the inlet and the bottom of said furnace are at least three liquid fuel burners which project into said melting furnace through the cylindrical wall thereof; and the gas refining room being a 2-stage centrally horizontally baffled chamber, the lower portion of which is connected to the upper portion of the melting furnace at a position above the inlet thereof, the upper portion of which is connected to the gas holding chamber, a feed funnel being directly attached to the upper extreme of said gas refining room and a sludge outlet being at the lower extreme thereof.

References Cited in the file of this patent

UNITED STATES PATENTS

| | | |
|---|---|---|
| 1,003,682 | Yost | Sept. 19, 1911 |
| 2,184,300 | Hodson et al. | Dec. 26, 1939 |
| 2,282,124 | Fahrenwald | May 5, 1942 |
| 2,368,699 | Arnold | Feb. 6, 1945 |
| 2,445,648 | Truesdale | July 20, 1948 |
| 2,586,818 | Harms | Feb. 26, 1952 |
| 2,745,733 | Oster | May 15, 1956 |
| 2,973,260 | Nogiwa | Feb. 28, 1961 |